United States Patent
Patel et al.

(10) Patent No.: US 9,442,631 B1
(45) Date of Patent: Sep. 13, 2016

(54) METHODS AND SYSTEMS FOR HANDS-FREE BROWSING IN A WEARABLE COMPUTING DEVICE

(71) Applicant: Google Inc., Mountain View, CA (US)

(72) Inventors: Nirmal Patel, Sunnyvale, CA (US); Hayes Solos Raffle, Palo Alto, CA (US); Mat Balez, San Francisco, CA (US); Max Benjamin Braun, San Francisco, CA (US); Jerrica Jones, Mountain View, CA (US)

(73) Assignee: Google Inc., Mountain View, CA (US)

( * ) Notice: Subject to any disclaimer, the term of this patent is extended or adjusted under 35 U.S.C. 154(b) by 334 days.

(21) Appl. No.: 14/216,623

(22) Filed: Mar. 17, 2014

Related U.S. Application Data

(60) Provisional application No. 61/932,063, filed on Jan. 27, 2014.

(51) Int. Cl.
*G06F 3/048* (2013.01)
*G06F 3/0482* (2013.01)
*G06F 3/0346* (2013.01)
*G06F 3/01* (2006.01)

(52) U.S. Cl.
CPC ............. *G06F 3/0482* (2013.01); *G06F 3/012* (2013.01); *G06F 3/013* (2013.01); *G06F 3/0346* (2013.01)

(58) Field of Classification Search
CPC .. G06F 3/017; G06F 3/04883; G06F 3/0481; G06F 3/0482; G06T 19/006
USPC ......... 715/810, 841, 863; 345/158, 633, 659
See application file for complete search history.

(56) References Cited

U.S. PATENT DOCUMENTS

| | | | |
|---|---|---|---|
| 6,198,462 B1 | 3/2001 | Daily et al. | |
| 7,091,928 B2 | 8/2006 | Rajasingham | |
| 2002/0044152 A1 | 4/2002 | Abbott et al. | |
| 2009/0303676 A1* | 12/2009 | Behar | G06F 1/162 361/679.27 |
| 2011/0115883 A1* | 5/2011 | Kellerman | G06F 3/012 348/46 |
| 2011/0296351 A1* | 12/2011 | Ewing, Jr. | G06F 3/0346 715/841 |
| 2012/0194552 A1* | 8/2012 | Osterhout | G02B 27/0093 345/633 |
| 2012/0272179 A1 | 10/2012 | Stafford | |
| 2013/0007668 A1 | 1/2013 | Liu et al. | |
| 2013/0007672 A1* | 1/2013 | Taubman | G06F 3/012 715/863 |
| 2013/0016070 A1* | 1/2013 | Starner | G02B 27/017 345/175 |
| 2013/0021269 A1* | 1/2013 | Johnson | G06F 3/0488 345/173 |
| 2013/0187835 A1 | 7/2013 | Vaught et al. | |
| 2013/0293488 A1* | 11/2013 | Na | G06F 3/013 345/173 |
| 2014/0137020 A1* | 5/2014 | Sharma | G06F 3/0486 715/769 |

(Continued)

*Primary Examiner* — Haoshian Shih
(74) *Attorney, Agent, or Firm* — McDonnell Boehnen Hulbert & Berghoff LLP

(57) ABSTRACT

Methods and systems for hands-free browsing in a wearable computing device are provided. A wearable computing device may provide for display a view of a first card of a plurality of cards which include respective virtual displays of content. The wearable computing device may determine a first rotation of the wearable computing device about a first axis and one or more eye gestures. Based on a combination of the first rotation and the eye gestures, the wearable computing device may provide for display the navigable menu, which may include an alternate view of the first card and at least a portion of one or more cards. Then, based on a determined second rotation of the wearable computing device about a second axis and based on a direction of the second rotation, the wearable computing device may generate a display indicative of navigation through the navigable menu.

19 Claims, 12 Drawing Sheets

(56) References Cited

U.S. PATENT DOCUMENTS

| | | | | |
|---|---|---|---|---|
| 2014/0215380 A1* | 7/2014 | Kang | ............ | G06F 3/0483 715/781 |
| 2014/0372944 A1* | 12/2014 | Mulcahy | ............ | G06F 3/04815 715/810 |
| 2015/0234455 A1* | 8/2015 | LaValle | ............ | G06F 3/012 345/8 |

* cited by examiner

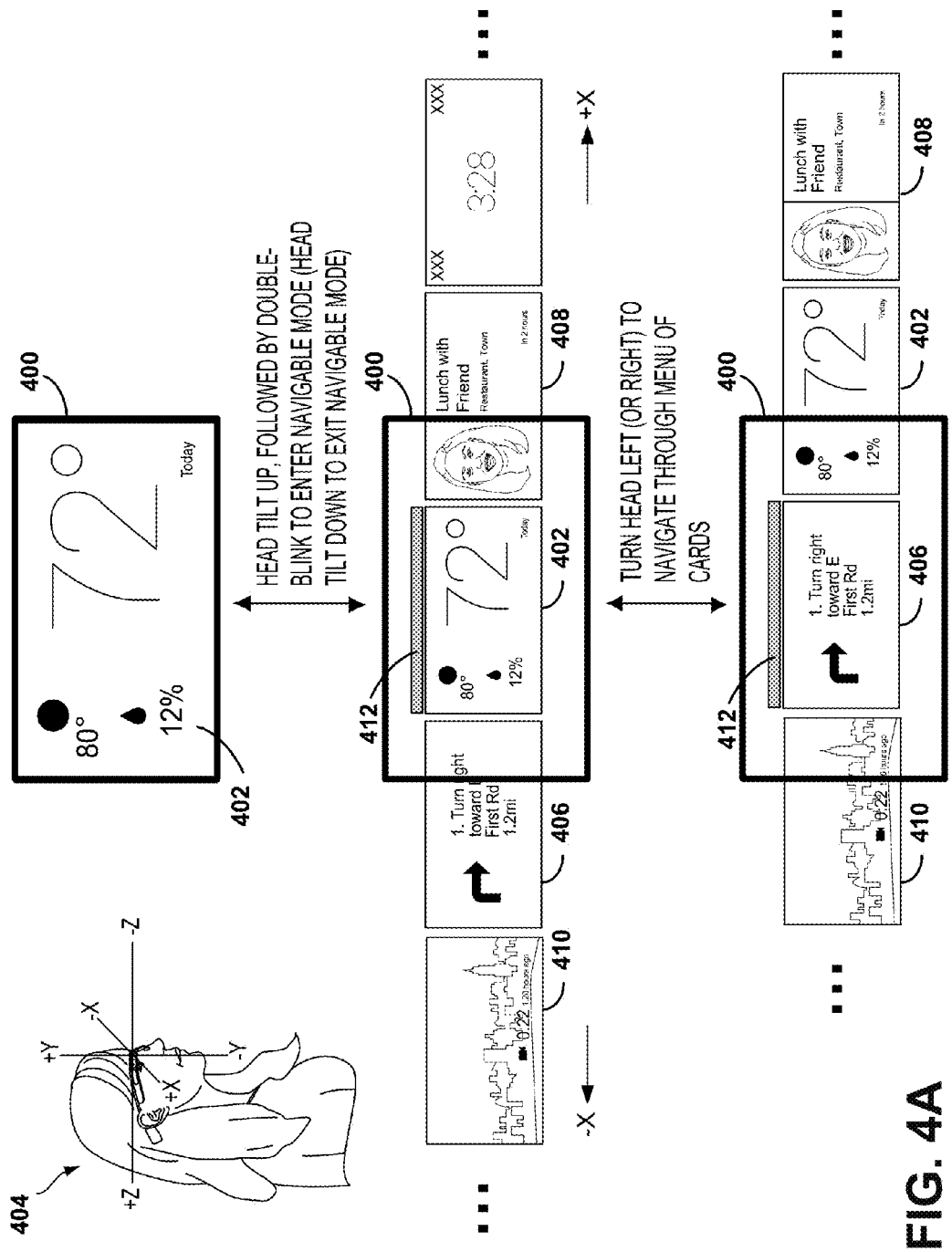

METHODS AND SYSTEMS FOR HANDS-FREE BROWSING IN A WEARABLE COMPUTING DEVICE

CROSS-REFERENCE TO RELATED APPLICATION

The present disclosure claims priority to U.S. Provisional Application No. 61/932,063, filed on Jan. 27, 2014, the entire contents of which are herein incorporated by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

The present application discloses methods and systems for hands-free browsing in a wearable computing device. In one aspect, a method is described. The method may involve a wearable computing device providing for display a view of a first card of a plurality of cards, where the plurality of cards include respective virtual displays of content. The method may also involve determining a first rotation of the wearable computing device about a first axis. The method may also involve determining one or more eye gestures, where a combination of the first rotation and the one or more eye gestures is indicative of a request to display a navigable menu of the plurality of cards. The method may further involve, based on the request to display the navigable menu, providing for display the navigable menu, where the navigable menu includes an alternate view of the first card and at least a portion of one or more of the plurality of cards. The method may still further involve determining a second rotation of the wearable computing device about a second axis, where the second rotation is indicative of a request to navigate through the navigable menu. The method may yet still further involve, based on the request to navigate through the navigable menu and based on a direction of the second rotation, generating a display indicative of navigation through the navigable menu.

In another aspect, a non-transitory computer-readable medium having stored therein instructions, that when executed by a wearable computing device, cause the wearable computing device to perform functions is provided. The functions may include providing for display a view of a first card of a plurality of cards, where the plurality of cards include respective virtual displays of content. The functions may also include determining a first rotation of the wearable computing device about a first axis. The functions may also include determining one or more eye gestures, where a combination of the first rotation and the one or more eye gestures is indicative of a request to display a navigable menu of the plurality of cards. The functions may further include, based on the request to display the navigable menu, providing for display the navigable menu, where the navigable menu includes an alternate view of the first card and at least a portion of one or more of the plurality of cards. The functions may still further include determining a second rotation of the wearable computing device about a second axis, where the second rotation is indicative of a request to navigate through the navigable menu. The functions may yet still further include, based on the request to navigate through the navigable menu and based on a direction of the second rotation, generating a display indicative of navigation through the navigable menu.

In yet another aspect, a system is provided that includes a head-mountable device (HMD), at least one processor coupled to the HMD, and data storage comprising instructions executable by the at least one processor to cause the system to perform functions. The functions may include providing for display a view of a first card of a plurality of cards, where the plurality of cards include respective virtual displays of content. The functions may also include determining a first rotation of the HMD about a first axis. The functions may also include determining one or more eye gestures, where a combination of the first rotation and the one or more eye gestures is indicative of a request to display a navigable menu of the plurality of cards. The functions may further include, based on the request to display the navigable menu, providing for display the navigable menu, where the navigable menu includes an alternate view of the first card and at least a portion of one or more of the plurality of cards. The functions may still further include determining a second rotation of the HMD about a second axis, where the second rotation is indicative of a request to navigate through the navigable menu. The functions may yet still further include, based on the request to navigate through the navigable menu and based on a direction of the second rotation, generating a display indicative of navigation through the navigable menu.

In yet another example, a system is provided that includes a means for providing for display a view of a first card of a plurality of cards, where the plurality of cards include respective virtual displays of content. The system further includes a means for determining a first rotation of the wearable computing device about a first axis. The system further includes a means for determining one or more eye gestures, where a combination of the first rotation and the one or more eye gestures is indicative of a request to display a navigable menu of the plurality of cards. The system further includes a means for, based on the request to display the navigable menu, providing for display the navigable menu, where the navigable menu includes an alternate view of the first card and at least a portion of one or more of the plurality of cards. The system further includes a means for determining a second rotation of the wearable computing device about a second axis, where the second rotation is indicative of a request to navigate through the navigable menu. The system further includes a means for, based on the request to navigate through the navigable menu and based on a direction of the second rotation, generating a display indicative of navigation through the navigable menu.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 4A and 4B are example implementations of the example method, in accordance with at least some embodiments described herein.

DETAILED DESCRIPTION

Figure 1A:
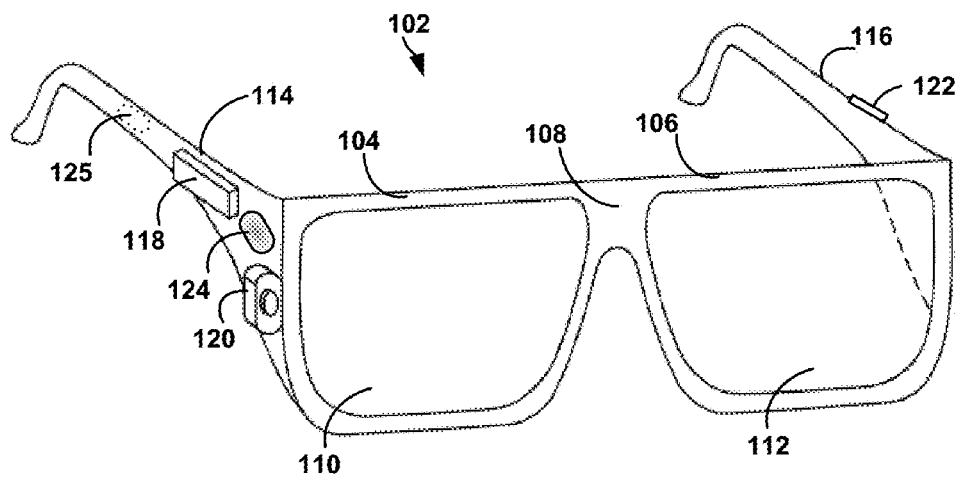
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Computing devices, such as wearable computing devices (e.g., HMDs), may organize content in the form of "cards," where each card includes a respective virtual display of content. Disclosed herein are various methods for hands-free browsing in a computing device, such as navigation through a menu of cards, for instance. Hands-free inputs such as head tracking, head gestures, eye tracking, eye gestures (i.e. winking, blinking, double-blinking) and speech input can be used for navigating cards of content. Some of these inputs can be used in combination with one another or used in isolation.

An example method may involve a wearable computing device providing for display a view of a first card of a plurality of cards. The wearable computing device may then determine a first rotation of the wearable computing device about a first axis. For example, when the wearable computing device is an HMD worn by a wearer, the first rotation may be a rotation of the wearer's head (e.g., the wearer tilting his or her head upwards). Next, the wearable computing device may determine one or more eye gestures, such a double-blink (i.e., two successive eye blinks). This combination of the first rotation and the one or more eye gestures may be indicative of a request to display a navigable menu of the plurality of cards. Based on the request to display the navigable menu, the wearable computing device may then provide for display the navigable menu. The displayed navigable menu may include an alternate view of the first card (e.g., a zoomed-out view) and at least a portion of one or more of the plurality of cards. The wearable computing device may then determine a second rotation of the wearable computing device about a second axis, where the second rotation is indicative of a request to navigate through the navigable menu. Based on the request to navigate through the navigable menu and based on a direction of the second rotation, the wearable computing device may generate a display indicative of navigation through the navigable menu. For example, the wearer may turn and/or lean his or her head from side to side in order to navigate left and right through the navigable menu. In some embodiments, the wearer may be able to navigate faster through the navigable menu by leading or turning his or her head beyond a predetermined threshold. Other embodiments are possible as well.

Another example method may allow a user/wearer of a wearable computing device to navigate through a menu of cards one or more cards at a time, rather than a pan/scroll as described by the previous example method. The other example method may involve a wearable computing device providing for display a first card of a plurality of cards. The wearable computing device may then determine a rotation of the wearable computing device (e.g., a wearer turning his or her head to the side). Based on the rotation exceeding a given rotation threshold, the wearable computing device may provide for display, for a predetermined time window, a visual prompt to provide a request to navigate to a subsequent card of the plurality of cards. The visual prompt may take the form of a rectangular bar or arrow that appears on either side of the first card, for instance, or may take the form of the display "shifting" over slightly in order to show at least a portion of a subsequent card. The visual prompt may take other forms as well. The wearable computing device may then determine an eye gesture (e.g., a blink) indicative of the request to navigate to the subsequent card. In response to the eye gesture being determined within the predetermined time window and based on a direction of the rotation, the wearable computing device may generate a display indicative of navigation to the subsequent card (e.g., the subsequent card being either left or right of the first card).

Other example methods are also possible, such as a method including a combination of aspects of the two example methods described above.

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities.

The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
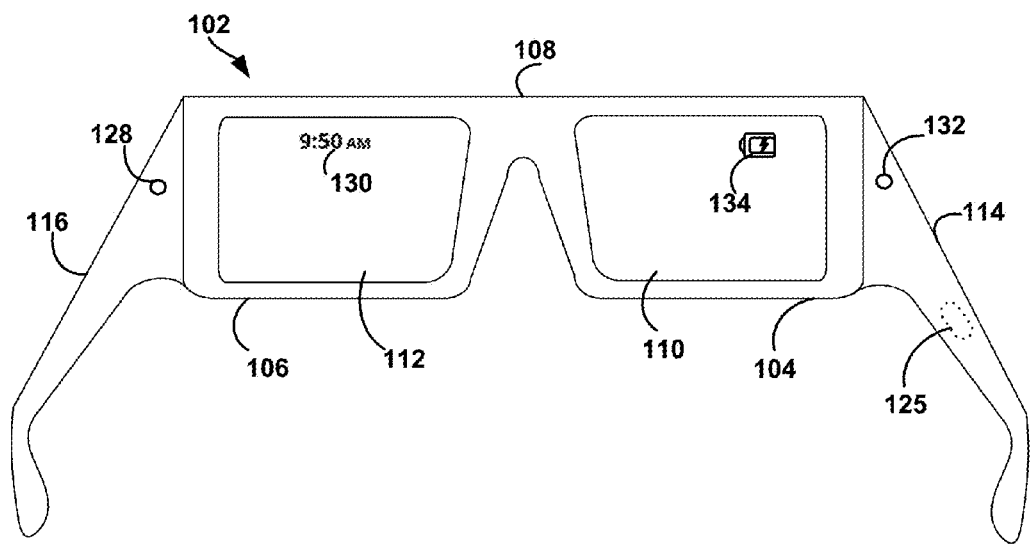
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
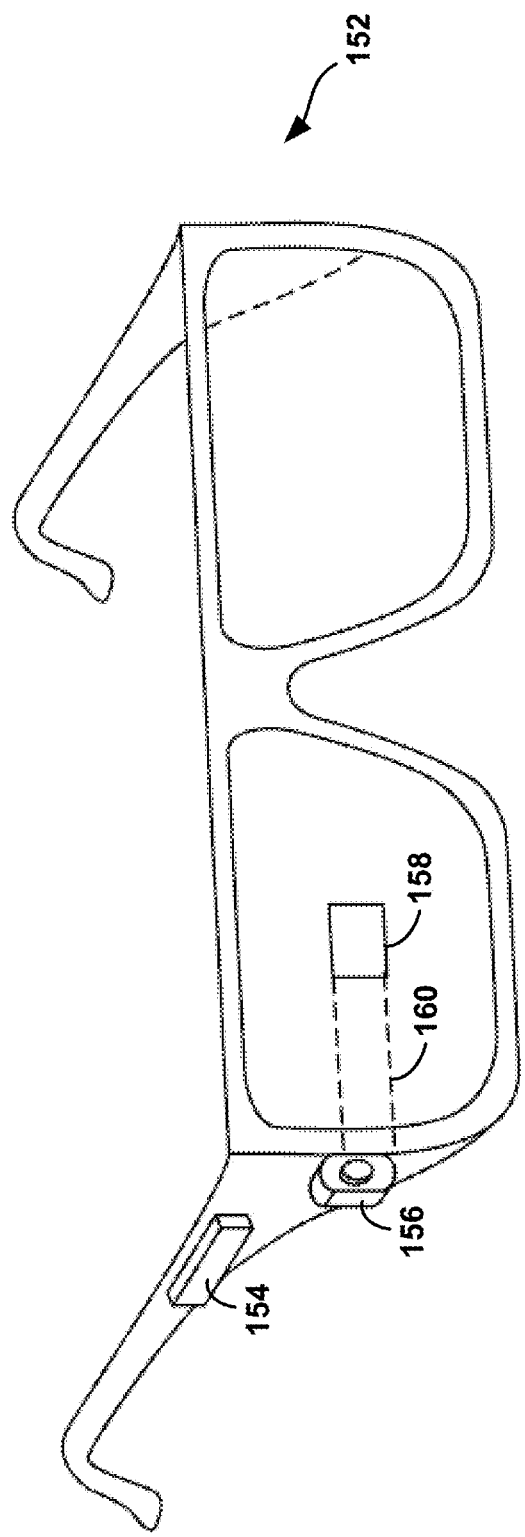
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
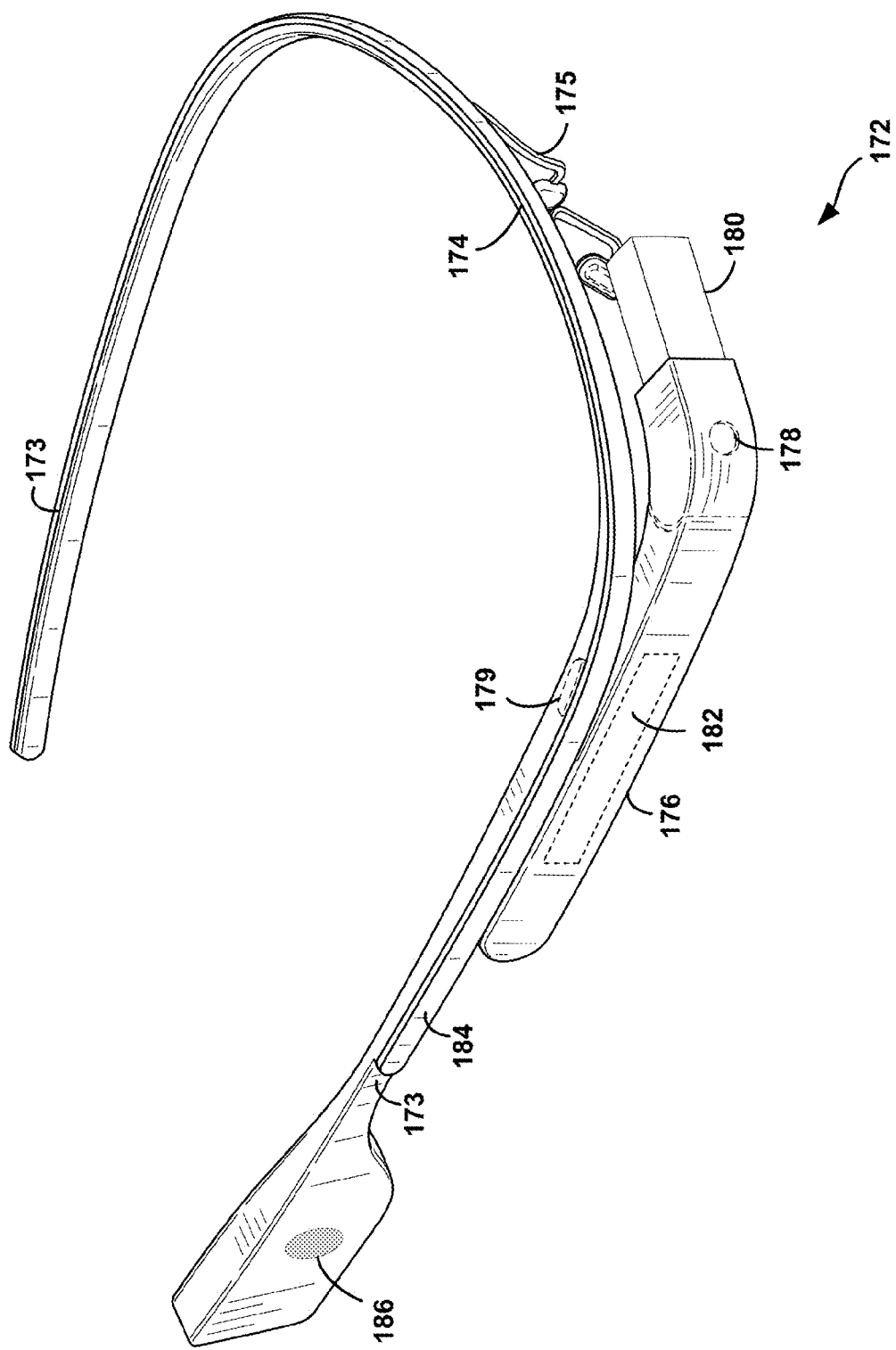
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

The HMD 172 may also include a finger-operable touch pad 182 similar to the finger-operable touch pad described with respect to FIG. 1A.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
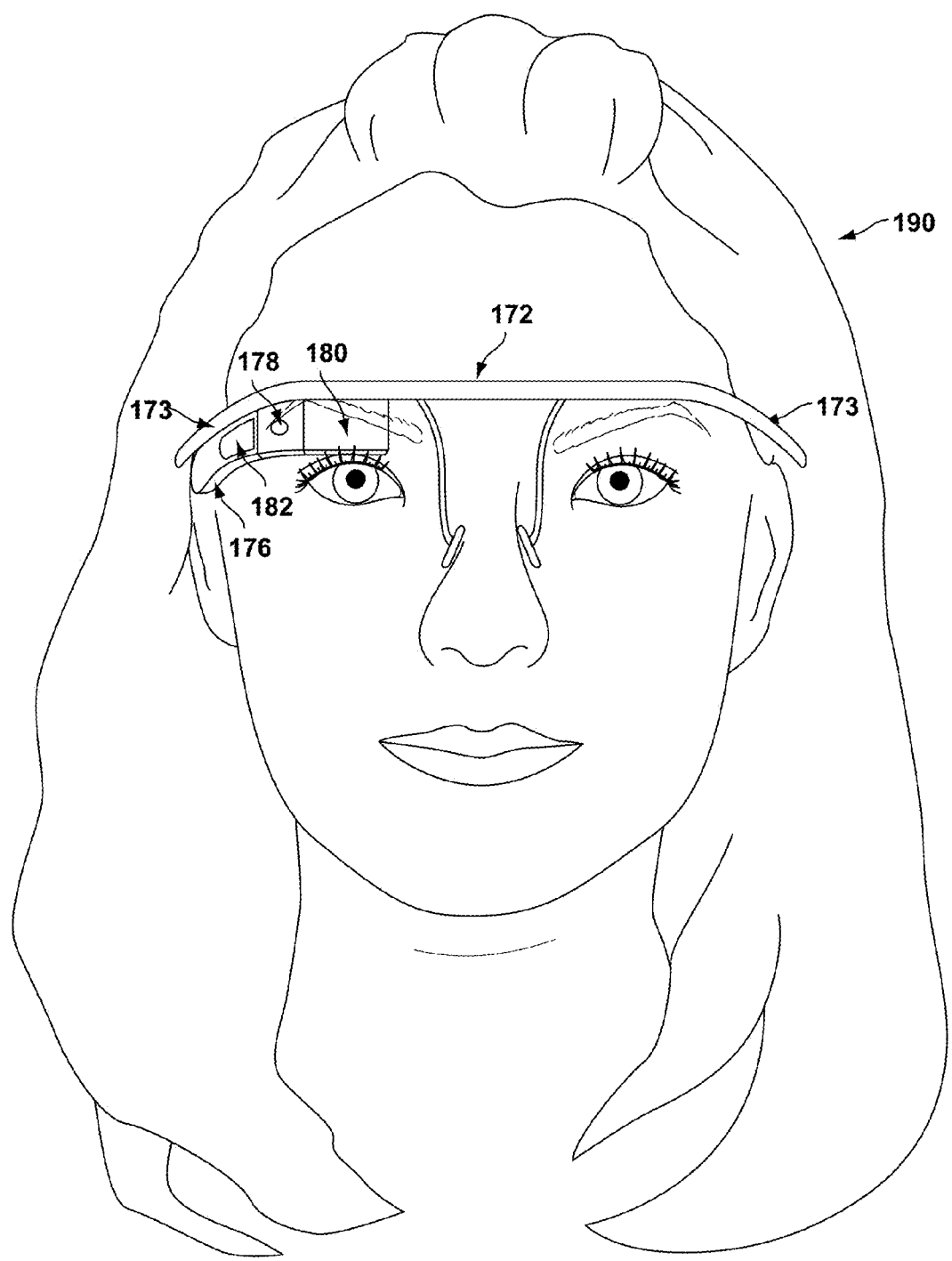
FIGS. 1E to 1G are simplified illustrations of the wearable computing system shown in FIG. 1D, being worn by a wearer.
Figure 1F:
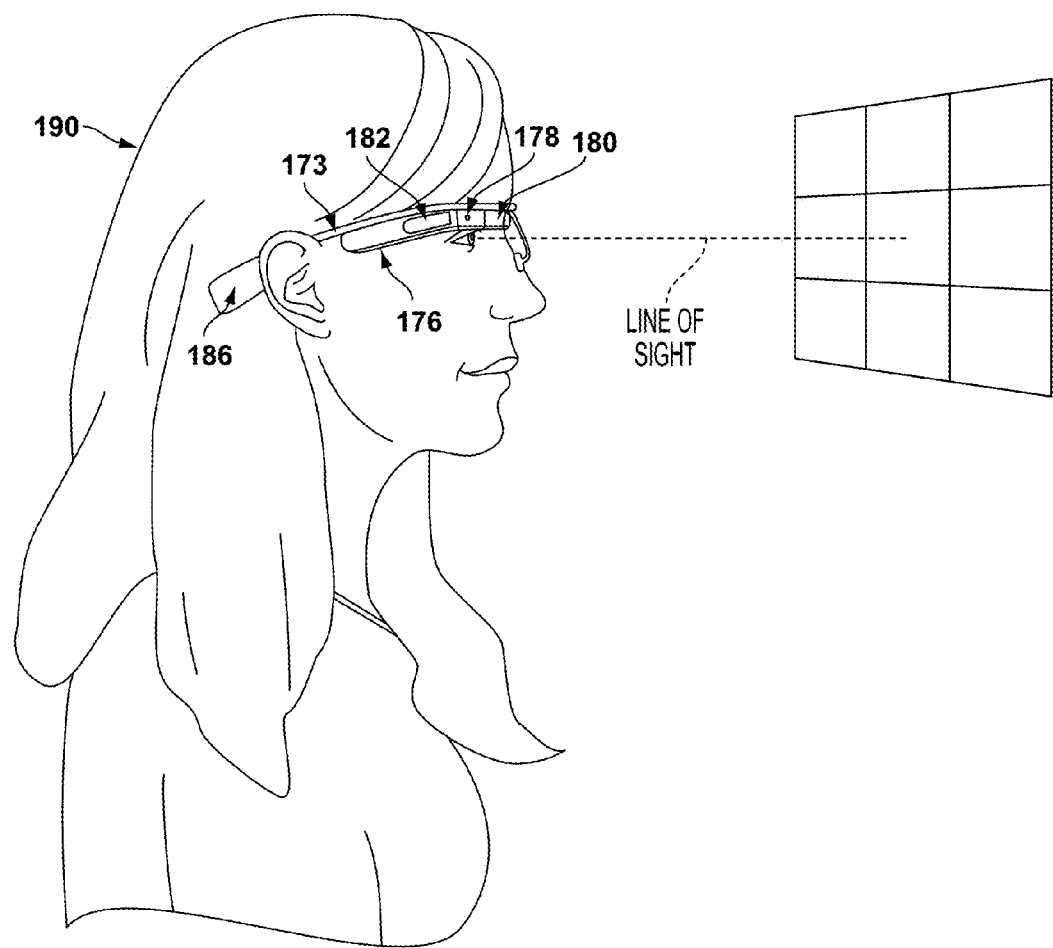
Figure 1G:
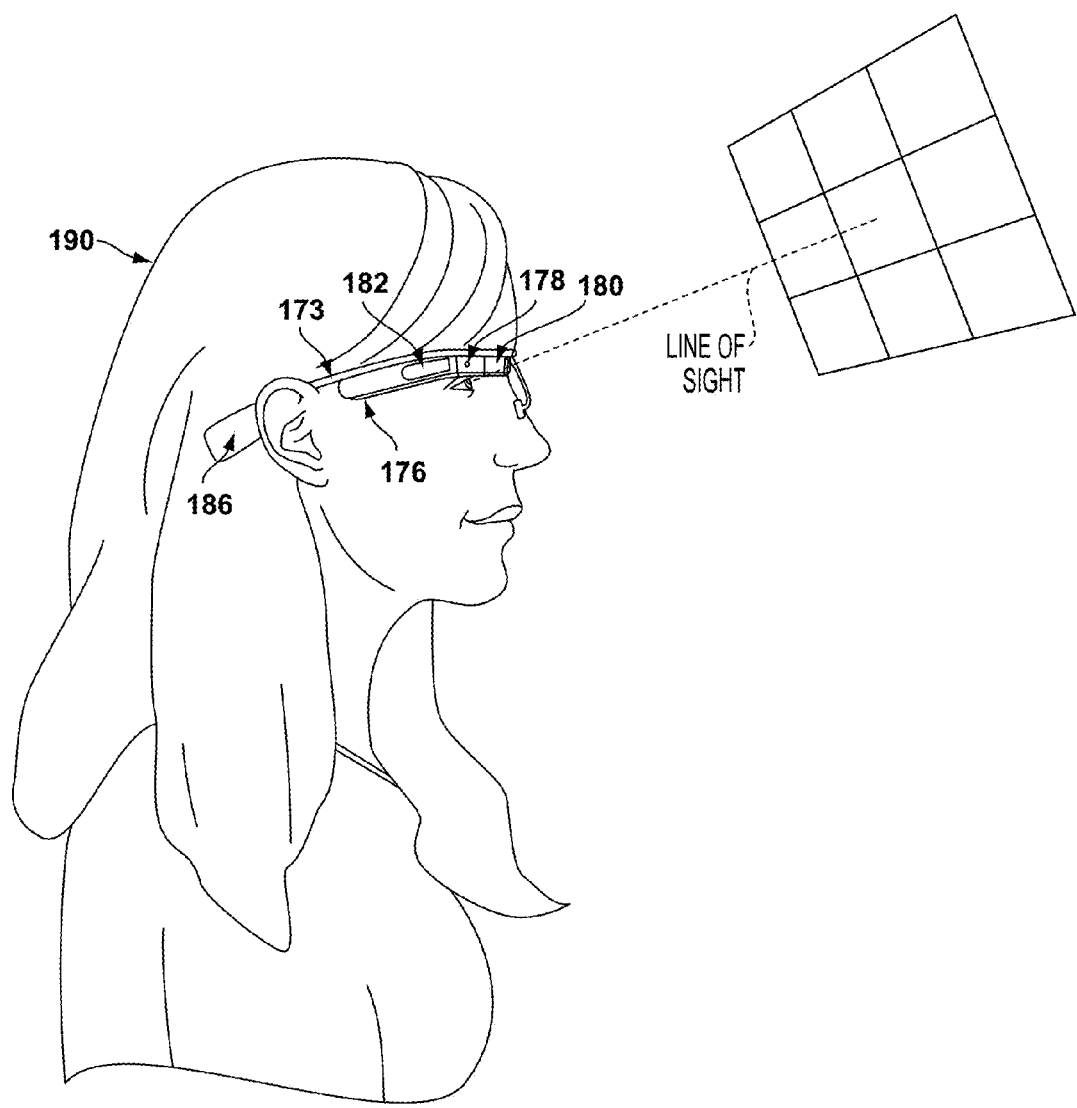

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
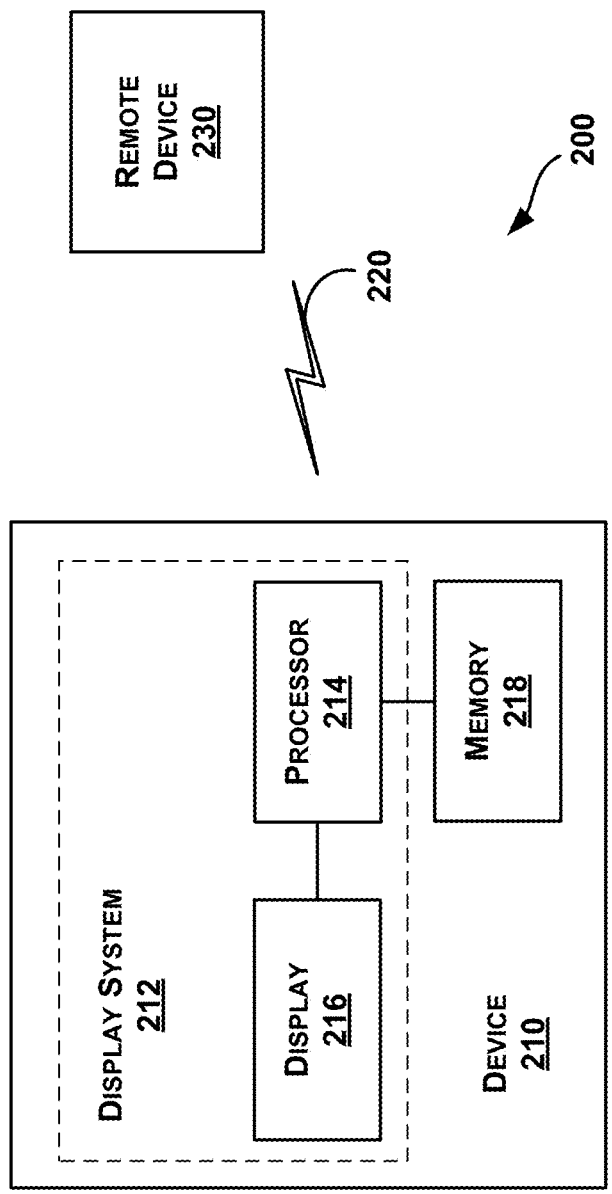
FIG. 2A is a simplified block diagram of a computing device according to an example embodiment.

FIG. 2A is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a display system 212 comprising a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2B:
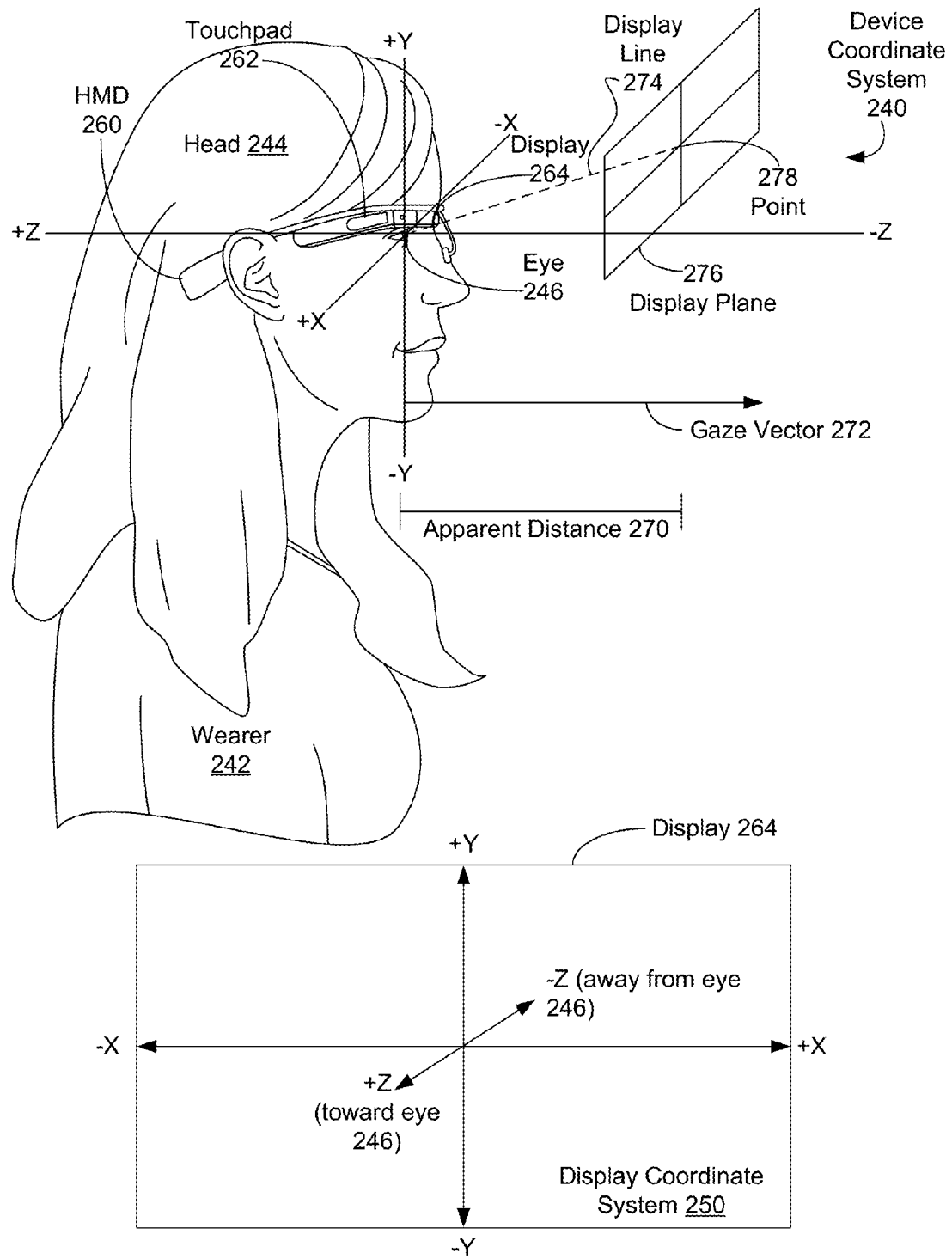
FIG. 2B shows a projection of an image by an HMD, according to an example embodiment.

FIG. 2B shows an example device coordinate system 240 and corresponding display coordinate system 250 in accordance with an embodiment. The device coordinate system 250 is used herein: when HMD 260 is level and upright on head 244 of wearer 242 with display 264 facing eye 246 of wearer 242, as shown in FIG. 2B, +X is right, +Y is up, and +Z is towards eye 246 (with respect to display 264) such that forward is −Z. In Figures showing the YZ plane, +X is toward the reader and −X is away from the reader in device coordinates. In terms of device coordinates, a swipe toward (sometimes termed swipe backward or swipe left) can involve a swipe, or movement by one or more fingers touching the touchpad, in the +Z direction. In device coordinates, a swipe away (sometimes termed swipe forward or swipe right) can involve swiping in the −Z direction.

Device coordinate system 240 can be used to specify a coordinate system for images shown in eye 246 of wearer 242 using display 264. FIG. 2B shows display coordinate system 250 for displaying images using display 264 as viewed by wearer 242. As shown in FIG. 2B, when HMD 260 is level and upright on head 244 with display 264 facing eye 246, +X in device coordinate system 250 is right along display 264, +Y in device coordinate system 250 is up with respect to display 264, and +Z in display coordinate system 250 is towards eye 246. For example, for fixed X and Y components in display coordinate system 250 objects shown on display 264 with a Z component of Z1 can appear to be larger to wearer 242 than objects having a Z component of Z2, where Z1>Z2. That is, as Z coordinates increase in display coordinate system 260, image displayed in display 264 using display coordinate system 250 appear increasingly larger up to the limits of display 264. In some embodiments, a two-dimensional display system can use coordinates of display coordinate system with a fixed Z component; e.g., Z=0. Unless specifically stated otherwise, X, Y, and Z components are specified below using display coordinate system 250.

HMD 260 can project an image in display plane 276 for view by wearer 242 at some apparent distance 270 along display line 274. For example, apparent distance 270 can be 1 meter, four feet, infinity, or some other distance. Display line 274 can be based on gaze vector 272. Gaze vector 272 tracks wearer 242's gaze, or direction of viewing. In FIG. 2B, wearer 242 is looking directly in the −Z direction, and thus gaze vector 272 is a vector along the −Z axis. For the sake of viewability, FIG. 2B shows gaze vector 272 below eye 246.

In an example shown in FIG. 2B, display line 274 can be directed to be above and to the right of gaze vector 272. Then, an image can be projected at display plane 276 that is perpendicular to display line 274 and includes at least point 278 where display line 274 is at apparent distance 270 from wearer 242. The image can be displayed in display plane 276 projected above and to the right of gaze vector 272; e.g., the image can be displayed as centered at point 278. Then, wearer 242 can look at a person or object along gaze vector 272 without the displayed image obscuring their gaze. In one example, the display element of the HMD 260 is translucent when not active (i.e. when an image is not being displayed), and so the wearer 242 can perceive objects in the real world along a vector corresponding to display line 274.

FIG. 2B shows that touchpad 262 is parallel, or at least substantially parallel, to display line 274, and thus is perpendicular, or at least substantially perpendicular to display plane 276. As such, touchpad 262 is at least substantially perpendicular to an image displayed in display plane 276. In some scenarios, touchpad 262 can be perpendicular to display plane 276 and so be perpendicular to an image displayed by display 264 in display plane 276. In other scenarios, touchpad 262 can be substantially, but not exactly, perpendicular to display plane 276 depending on a shape of a face of wearer 242, an exact angle that wearer 242 wears HMD 260 at any specific time, a specific configuration of HMD 260, and for other reasons that would cause touchpad 262 to vary from being perpendicular to an image displayed by display 264 in display plane 276. In particular embodiments, touchpad 262 is substantially perpendicular to an image displayed by display 264 if a line from touchpad 262 to a plane of the image, e.g., display plane 276 is within 10 degrees of being perpendicular to the plane of the image.

Figure 3:
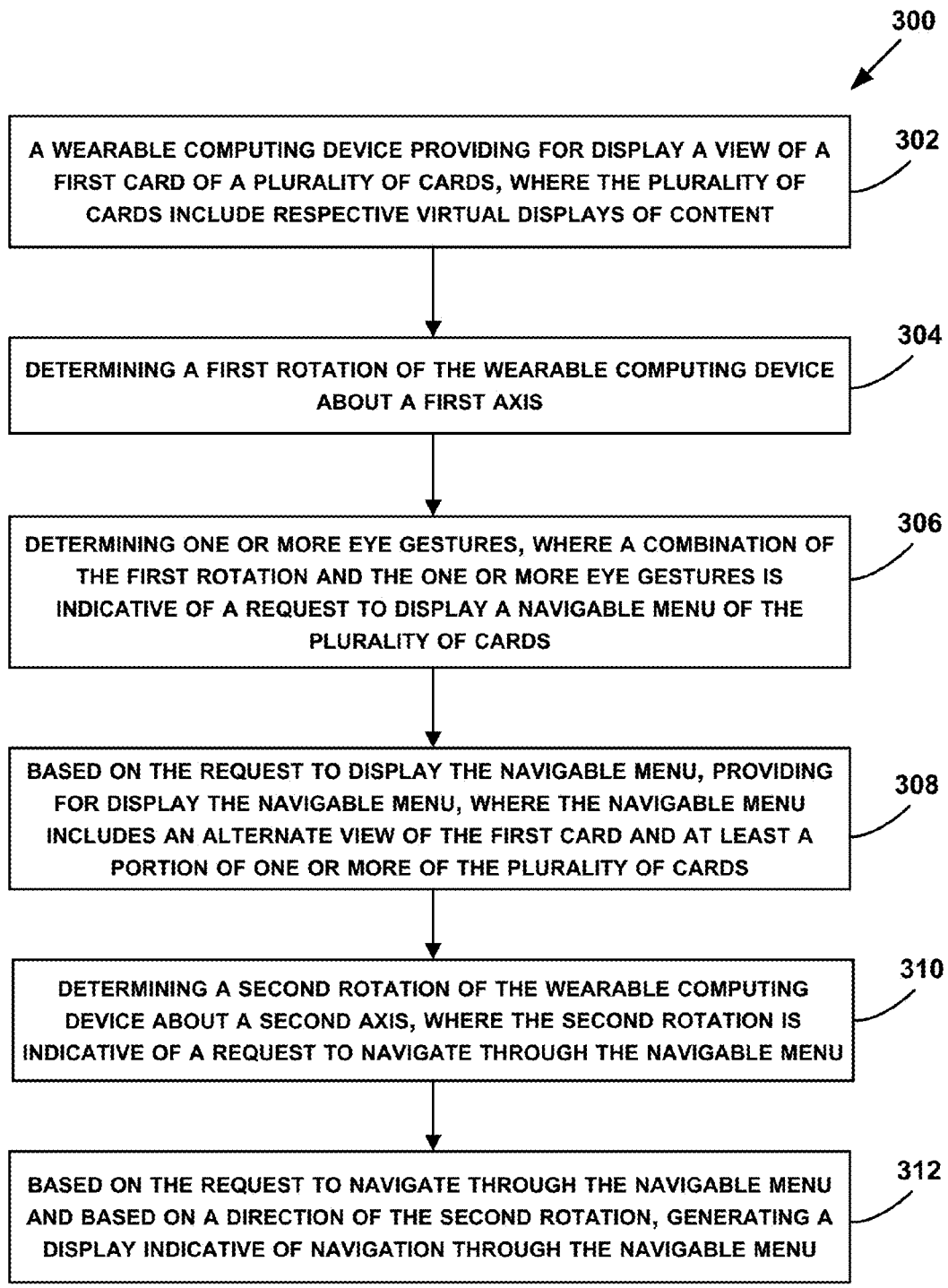
FIG. 3 is a flow chart of an example method according to at least some embodiments described herein.

FIG. 3 is a flow chart of an example method 300, according to at least some embodiments described herein. Method 300 may include one or more operations, functions, or actions as illustrated by one or more of blocks 302-312. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

For the sake of example, the method 300 will be described as implemented by an example wearable computing device, such as the HMDs illustrated in FIGS. 1A-2B. It should be understood, however, that other computing devices, such as wearable computing devices (e.g., watches), or combinations of computing devices maybe configured to implement one or more steps of the method 300. Also for the sake of example, the method 300 will be described in conjunction with FIGS. 4A-5, which each of which illustrates an example implementation of the method 300. It should be understood, however, that other implementations are also possible.

At block 302, the method 300 includes a wearable computing device providing for display a view of a first card of a plurality of cards, where the plurality of cards include respective virtual displays of content. FIG. 4A illustrates a display 400 of a wearable computing device, and the display 400 includes a first card 402 of a plurality of cards. In some examples, the plurality of cards may be referred to as a "timeline," or an ordered sequence of cards. In some examples, a wearer can view one card at a time in full-screen view, as shown in FIG. 4A with a full-screen view of the first card 402. In some examples, such as those illustrated by FIGS. 4A-5, the timeline make take the form of a "horizontal strip" of cards, as viewed by the wearer. In other examples, the timeline, or the plurality of cards in general, make take other forms and have other dimensions.

At block 304, the method 300 includes determining a first rotation of the wearable computing device about a first axis. In some examples, the rotation of the wearable computing device may correspond to a rotation of the wearer's head. Such a rotation may occur about the x-, y-, or z-axis of the wearable computing device, as shown by coordinate system 404 in FIGS. 4A and 4B, and such a rotation may be measured by one or more gyroscopes, accelerometers, or other sensors coupled to the wearable computing device. The axes of rotation may also be referred to herein as a pitch axis (i.e., the x-axis of coordinate system 404), a yaw axis (i.e., the y-axis of coordinate system 404), and a roll axis (i.e., the z-axis of coordinate system 404).

In some examples, the first rotation of the wearable computing device may be about the pitch axis. Such a rotation may take the form of the wearer tilting his or her head up while wearing the wearable computing device (e.g., leaning head back). In other examples, however, the first rotation may take the form of other combinations of rotations about one or more of the pitch, yaw, and roll axes. In some examples, the first rotation may not be detected unless the rotation angle exceeds a given threshold. For instance, the wearable computing device may not determine slight head movements (e.g., an angular displacement of about 15 degrees or less) to be the first rotation.

An angular displacement of the first rotation may be measured with respect to a first reference point indicative of an angular position of the wearable computing device about one or more of the axes, such as the pitch axis. For example, the first reference point may be at a point where the wearer's head is about level and not rotated (e.g., turned) beyond a given threshold in any direction. Further, the wearable computing device may have stored other reference points for determining (e.g., measuring) other rotations, including rotations about the yaw and roll axes, other rotations about the pitch axis, and rotations about a combination of axes. For embodiments with multiple reference points, one or more of the other reference points may be the same as the first reference point.

In some examples, the wearer may be enabled to manually calibrate and store the reference points using the wearable computing device. In other examples the wearable computing device may periodically and automatically normalize the reference points, calculating and recalculating new reference points based on a current angular displacement of the wearer's head from the previous reference point(s). The first reference point may be initially determined upon turning on the wearable computing device, and/or may be determined within a given time window after turning on the wearable computing device. The first reference point and/or other reference points may be determined in response to other trigger events as well.

At block 306, the method 300 includes determining one or more eye gestures, where a combination of the first rotation and the one or more eye gestures is indicative of a request to display a navigable menu of the plurality of cards. In some examples, the combination of the first rotation and the one or more eye gestures make take the form of both the first rotation and the one or more eye gestures occurring substantially simultaneous to each other. In other examples the combination may take the form of a sequence of one or more head movements, eye gestures, voice commands, and/or other hands-free actions, such as the first rotation occurring before the one or more eye gestures, or vice versa. For instance, as shown in FIG. 4A, the combination of the first rotation and the one or more eye gestures may take the form of an upward head tilt followed by two rapid, successive eye blinks, which may trigger the wearable computing device to enter a "navigable mode" in which the wearer can then navigate to another card in the menu of cards, such as panning through the timeline.

Other combinations of head movements, eye gestures, voice commands, and/or other hands-free actions may trigger the wearable computing device to display the navigable menu as well, such as one or more of: tilting a head up and blinking at least once, tilting a head up and winking, tilting a head up beyond a given angular displacement threshold and blinking/winking, keeping a head tilted up for a predetermined period of time, tilting a head up and blinking/winking within a predetermined time window, tilting a head up and providing a voice command, and moving a head back and forth successively (e.g., a "nudge" movement), among many others combinations.

Figure 4B:
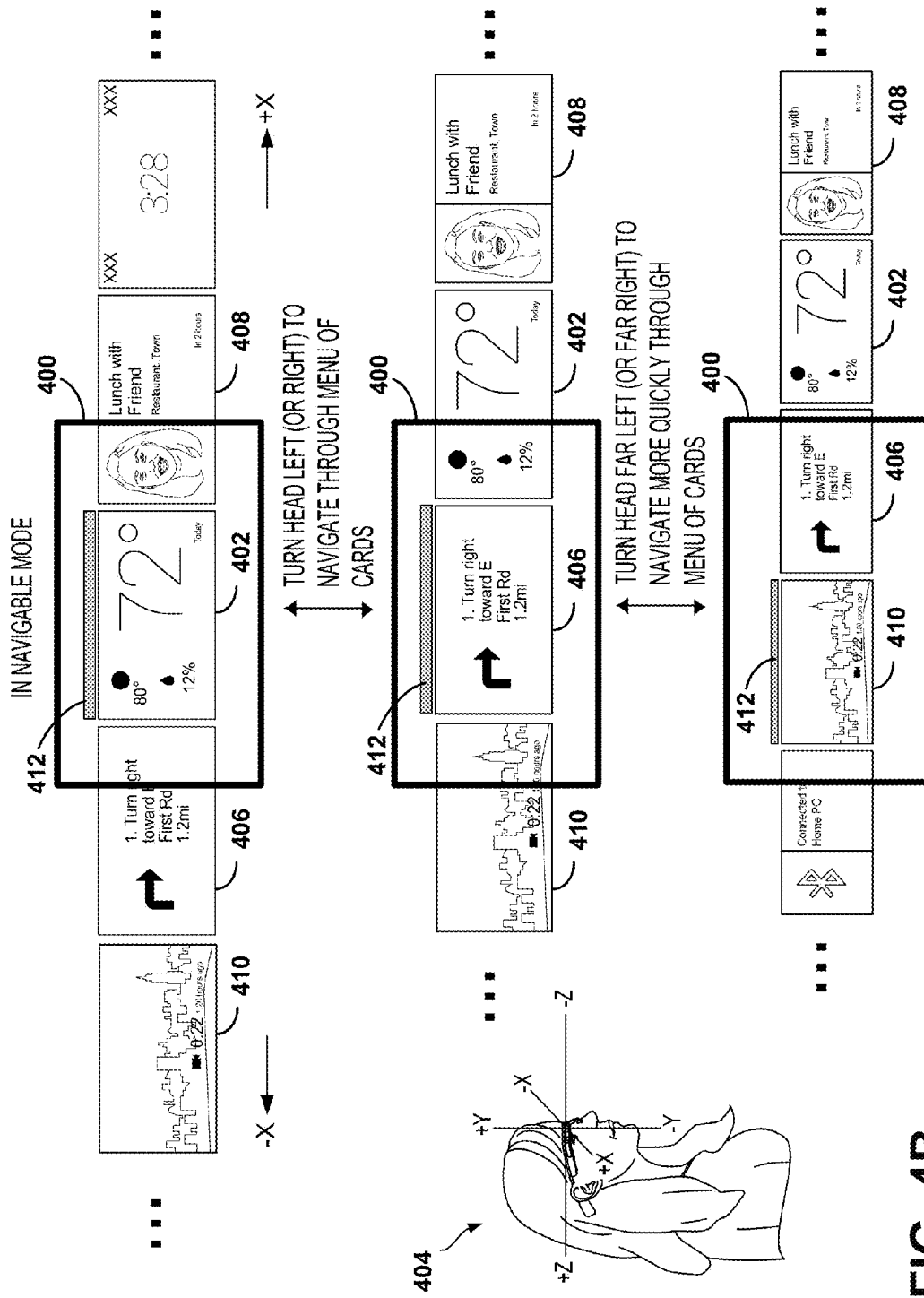

At block 308, the method 300 includes, based on the request to display the navigable menu, providing for display the navigable menu, where the navigable menu includes an alternate view of the first card and at least a portion of one or more of the plurality of cards. As shown in FIGS. 4A and 4B, once the wearable computing device enters the navigable mode and displays the navigable menu, the alternate view of the first card 402 may be displayed along with at least a portion of subsequent cards 406, 408 of the plurality of cards to the left (−x direction) and right (+x direction) of the first card 402. In some examples, the alternate view may be a 50% zoomed-out view of the full-screen view. As such, after the wearable computing device determines the combination of the first rotation and the one or more eye gestures, the wearable computing device may provide for display an animation of the full-screen view of the first card 402 zooming out to a different view of the first card 402, such as the 50% zoomed-out view. In addition, other cards in the navigable menu may be displayed at zoomed-out views that are less than, equal to, or greater than 50%.

At block 310, the method 300 includes determining a second rotation of the wearable computing device about a second axis, where the second rotation is indicative of a request to navigate through the navigable menu.

And at block 312, the method 300 includes, based on the request to navigate through the navigable menu and based on a direction of the second rotation, generating a display indicative of navigation through the navigable menu. In some examples, such as those illustrated in FIGS. 4A and 4B, the navigation may take the form of a pan through the navigable menu, and the direction of the second rotation may correspond to a direction of the pan through the navigable menu. Other forms of navigation through the navigable menu are possible as well.

In some examples, the second rotation of the wearable computing device may be about the yaw axis (i.e., the y-axis, as shown in the coordinate system 404). In other examples, however, the second rotation may take the form of other combinations of rotations about one or more of the pitch, yaw, and roll axes. The second rotation may take the form of the wearer turning his or her head left or right while wearing the wearable computing device. However, it should be understood that the second rotation may take other forms. Alternate head movements may also be used to navigate through the navigable menu as well, such as two successive head movements (e.g., a "nudge" movement, where the wearer's head is turned left or right to a certain angle, and then quickly turned back to its initial position). Further, eye gestures, voice commands, and/or other hands-free actions can be used to navigate the navigable menu as well.

In some examples, upon entering the navigable mode and displaying the navigable menu, the wearable computing device may determine a second reference point indicative of an angular position of the wearable computing device about the second axis. For instance, the second reference point may be determined substantially simultaneous to the wearable computing device determining the one or more eye gestures. As such, an angular displacement of the second rotation and any subsequent rotations about the second axis may be measured with respect to that second reference point. In some examples, however, the second reference point may be recalculated and normalized based on other movements of the wearer's head, as noted with respect to the first reference point.

As such, the wearable computing device generating the display indicative of the navigation through the navigable menu may be further based on the angular displacement of the second rotation from the second reference point. For example, the amount of content displayed by the wearable computing device with respect to the navigable menu may be adjustable and associated to given angular displacements. For instance, while the wearer is panning through the navigable menu, the wearable computing device may be configured to display three cards of the plurality of cards at a time for each rotation of six degrees from the second reference point. Alternatively, the wearable computing device may be configured to display navigation through the navigable menu more fluidly rather than only displaying a given amount of content at a time or per a given angular displacement. As another example, the angular displacement of the second rotation from the second reference point may be indicative of a request to display alternate views of the cards and/or display navigation at alternate speeds. Further, subsequent rotations about the second axis or other axes may be indicative of requests to navigate through the navigable menu with other alternate views of the cards, at other speeds, or in other manners. It should be understood that various angles of rotation and ranges of angles of rotation may be associated to and trigger different types of navigation through the navigable menu and through a display of content in general.

In some examples, certain types of navigation may be triggered based on the angular displacement of the second rotation from the second reference point with respect to a predetermined angular displacement threshold. For instance, no navigation may be triggered when the second rotation falls below the threshold. As another example, navigation at a first speed may be triggered when the second rotation falls below the threshold. On the other hand, a head turn that exceeds the predetermined angular displacement threshold from the second reference point may correspond to another type of navigation through the navigable menu, such as navigation at a second speed that is threshold faster than the first speed. In some examples, alternate views of the cards may be associated with the speed at which the wearer is navigating through the navigable menu. Further, in some examples, the speeds at which the wearer can navigate through the navigable menu may be limited to a maximum speed. The speeds may be predetermined and/or may be calibratable by the wearer.

With respect to FIGS. 4A and 4B, the wearable computing device may initially display the first card 402. Upon the wearer triggering the navigable mode, the wearable computing device may then display an alternate view of card 402 once triggering the navigable mode. While in the navigable mode, the wearer may turn his or her head in order to pan or otherwise navigate through the navigable menu, such as a navigation left to card 406 or a navigation right to card 408. When the wearable computing device determines that the wearer's head is turned below the predetermined angular displacement threshold, the wearable computing device may generate a display indicative of navigation through the navigable menu at a first speed. Further, as shown, alternate views of the cards may be displayed and associated with the first speed of navigation, such as 50% zoomed-out views or other views compared to the full-screen views. But when the wearable computing device determines that the wearer's head is turned beyond the predetermined angular displacement threshold, the wearable computing device may generate a display indicative of navigation through the navigable menu at a second speed that is threshold greater than the first speed. For instance, when the wearer initially navigates through the navigable menu to the left from card 402, such as to card 406, the wearer can more quickly navigate to card 410 and beyond by turning his or her head even further to the left. In some examples, the second speed of navigation may be associated with other views of the cards (e.g., 33% zoomed-out views) that are different than the views associated with the first speed of navigation. As shown in FIG. 4B, the view of cards 406 and 410 in the display 400 is zoomed-out even further when the wearer's head is turned beyond a predetermined angular displacement threshold than when the wearer's head is turned less than the threshold.

In all instances of rotations described herein, alternate or additional speeds of navigation are also possible. And different types of navigation (e.g., different presentations of content) may be associated with different speeds of navigation.

In some examples, when the second rotation exceeds the predetermined angular displacement threshold, navigation through the navigable menu may be performed/displayed automatically and may not be dynamically controlled by subsequent rotations about the second axis. In such examples, the wearable computing device may display a pan or other type of navigation through the navigable menu in a direction corresponding to the direction of the initial second rotation, and may continue to automatically navigate through the navigable menu in that direction until receiving other head movements, eye gestures, etc. indicative of a request to stop navigating. In a similar example, when the wearer's head is turned to a given position and then maintained at that position, the wearable computing device may continue to display a pan or other navigation through the navigable menu until the wearable computing device detects a head movement, eye gesture, etc. that indicates a request to stop navigation. Alternatively, when the wearer's head is turned to a given position and then kept at that position, panning or other navigation may be stopped until the wearer continues to rotate his or her head again.

In some examples, the wearable computing device may determine another combination of head movements, eye gestures, voice commands, and/or other hands-free actions, which may trigger the wearable computing device to exit the navigable menu/mode and display a full-screen view of the currently-selected card of the plurality of cards. As shown in FIGS. 4A and 4B, the currently-selected card of the plurality of cards may be visually indicated by a horizontal bar 412 above a particular card. Other visual indicators are possible as well.

In some examples, once the wearable computing device has determined the first rotation about the first axis, such as the wearer tilting his or her head upwards, the wearable computing device may only remain in the navigable menu/mode as long as the wearer's head remains tilted upwards beyond a given angular displacement threshold. In such examples, any further rotations of the wearer's head about the first axis that are determined by the wearable computing device may be recognized by the wearable computing device as a request to display the currently-selected card or generally exit the navigable menu (e.g., stop ongoing navigation through the navigable menu). As such, the request to exit the navigable menu and display a particular card (e.g., the currently-selected card, or a default card if no card is currently selected) of the plurality of cards may take the form of the wearable computing device determining another rotation about the first axis. Based on that request, and based on a direction of the other rotation, the wearable computing device may provide for display a full-screen view of the particular card. As previously noted, other head movements (e.g., nodding a head, rotating a head about other axes, etc.), eye gestures (e.g., winking, double-blinking, triple-blinking, etc.), hands-free actions, or combinations thereof may be used to exit the navigable mode as well.

Figure 5:
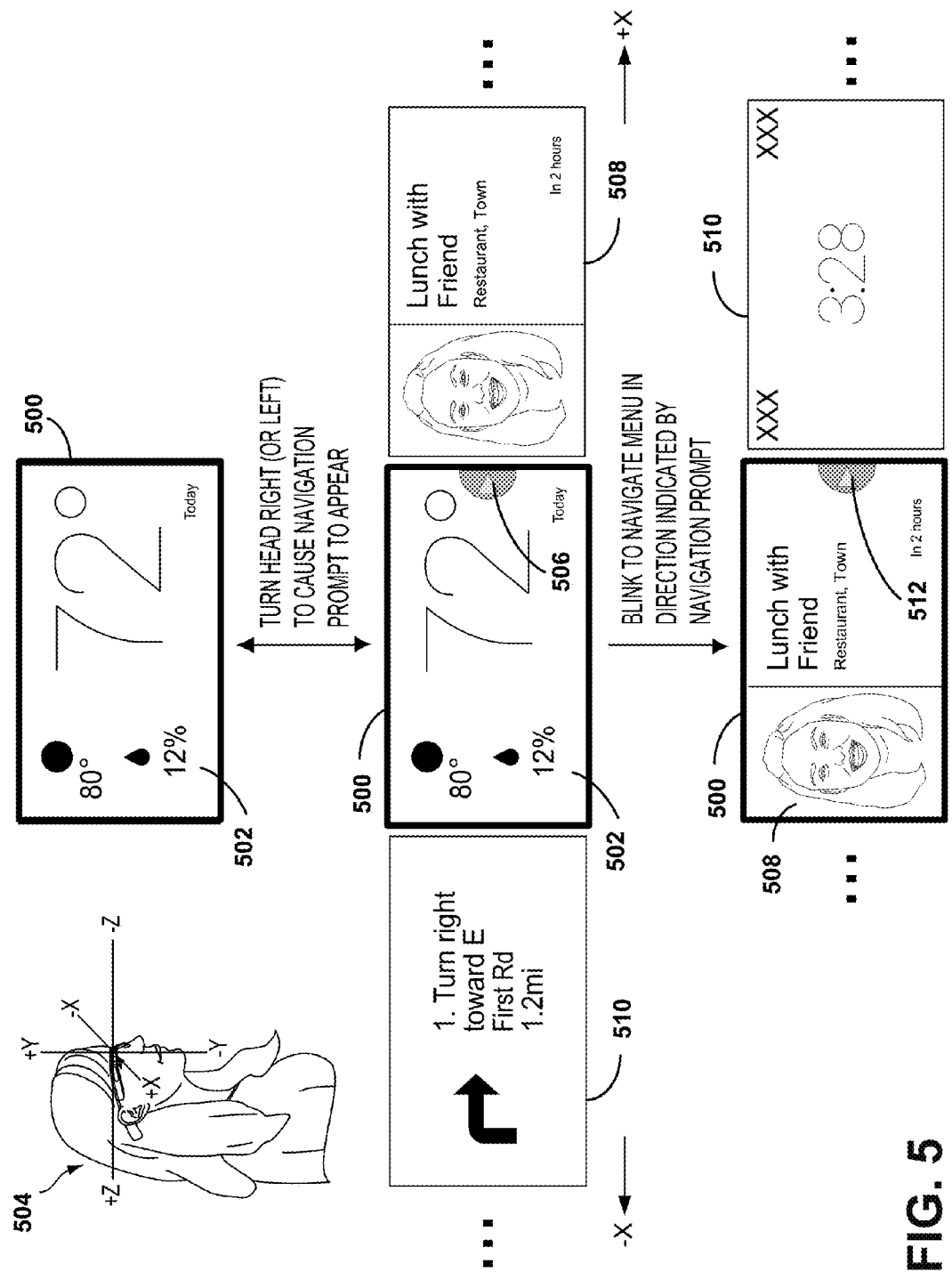
FIG. 5 is another example implementation of the example method, in accordance with at least some embodiments described herein.

FIG. 5 illustrates an implementation of another method of hands-free navigation. The other method may be implemented either independently from method 300 or incorporated with method 300. For instance, one or more aspects of this other method may be implemented after one or more aspects of method 300 have been performed, such as after the wearer has entered the navigable mode. Other implementations are also possible.

In some example embodiments, this method may involve a wearable computing device providing for display a first card of a plurality of cards. FIG. 5 illustrates a display 500 of a wearable computing device, and the display 500 includes a first card 502. The wearable computing device may then determine a rotation of the computing device (i.e., a "third rotation") about one or more of the yaw axis (i.e., the y-axis of coordinate system 504) and the roll axis (i.e., the z-axis of coordinate system 504). For instance, this rotation may take the form of a wearer's head turning left (e.g., in the −x direction) or right (e.g., in the +x direction) about the yaw axis. Then, based on the third rotation exceeding a given rotation threshold, the wearable computing device may provide for display a visual prompt to provide a request to navigate to a subsequent card in the navigable menu. The given rotation threshold may be similar to or different from other rotation thresholds described herein. In some examples, the given rotation threshold may be about fifteen degrees, though the given rotation may be greater or less than fifteen degrees in other examples. The angular displacement associated with the third rotation may be measured with respect to a reference point, and the reference point may be normalized to a center position every time the wearer's head and/or body moves. The reference point may be initially determined upon powering on the wearable computing device, or may be determined at other times. In some examples where this method is implemented in conjunction with method 300, the reference point may be determined upon receiving the first rotation and/or the one or more eye gestures as described with respect to blocks 304 and 306.

The visual prompt may be displayed according to a direction of the third rotation. For example, as shown in FIG. 5, after the wearer's head has been rotated right, the visual prompt 506 may be displayed on the right side of the display 500 over the first card 502. The rightward-displayed visual prompt may prompt the wearer to provide another head movement, eye gesture, or other hands-free action in order to navigate to the right to card 508, which is proximate to the first card 502, or navigate to other cards that are subsequent to card 508 to the right. Likewise, if the wearer's head had been rotated left, the visual prompt 506 would be displayed on the left side of the display 500 over the first card 502. The visual prompt provided on the left side of the display 500 may prompt the wearer to provide another head movement, eye gesture, or other hands-free action in order to navigate to the left to card 510, which is proximate to the first card 502, or navigate to other cards that are subsequent to card 510 to the right. In some examples, a command to navigate to subsequent cards may cause the wearable computing device to display a next card of the sequence, or may cause the wearable computing device to skip a given number of cards of the sequence and "jump" to a later card in the sequence so as to provide a faster means of navigation.

The visual prompt may appear for a predetermined time window, where the predetermined time window may be initiated once the wearable computing device displays the visual prompt. In some examples, the predetermined time window may be three seconds. During the predetermined time window, the wearable computing device may wait for various hands-free actions performed by the wearer that are indicative of commands such as commands to navigate through the navigable menu or navigate the timeline one full-screen card at a time. For instance, the wearable computing device may determine an eye gesture indicative of the request to navigate to a subsequent card, such as a request to navigate to cards 508 or 510 from card 502. In response to the eye gesture being determined within the predetermined time window, and based on the direction of the rotation, the wearable computing device may then generate a display indicative of navigation to the subsequent card. For instance, as shown in FIG. 5, the wearer may blink one or more eyes to navigate right from card 502 to card 508. The wearer may then be enabled to perform another head movement, eye gesture, etc. to select card 508, or continue to navigate to subsequent cards, such as card 510 or back to card 502.

In some embodiments, such as those where the method described with respect to FIG. 5 is implemented in conjunction with method 300, the visual prompt and eye gesture means of navigating from one card to another may be used as an alternate form of navigation through the navigable menu initiated by the first rotation and one or more eye gestures (e.g., head tilt up and double blink to initiate the navigable menu, followed by head turns and further blinks to navigate card-by-card through the navigable menu).

Again, it should be understood that various combinations of eye gestures, eye gazes, head movements, other hands-free actions, and associated commands are possible, and such combinations may be used for a variety of purposes. Such a variety of purposes may go beyond the scope of navigation through virtual displays of content, and may include other means of interacting with virtual displays of content. For example, a wearer may use hands-free actions to take pictures, zoom in on pictures, etc. Other examples are also possible.

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method, comprising:
   determining, by a wearable computing device, that the wearable computing device is being worn on a head; and
   while the wearable computing device is being worn:
   providing for display a view of a first card of a plurality of cards, wherein the plurality of cards include respective virtual displays of content;
   detecting first head-movement data indicative of a first head rotation about a first axis;
   detecting one or more eye gestures temporally associated with the first head rotation;
   responsive to detecting the one or more temporally-associated eye gestures, displaying a navigable menu, wherein the navigable menu includes an alternate view of the first card and at least a portion of one or more of the plurality of cards;
   detecting second head-movement data indicative of a second head rotation about a second axis; and
   responsive to detecting the second head-movement data, displaying a graphical representation of navigation through the navigable menu in a direction corresponding to the second head rotation.

2. The method of claim 1, wherein the wearable computing device is a head-mountable computing device.

3. The method of claim 1, wherein the one or more eye gestures include at least one eye blink.

4. The method of claim 1, wherein the first axis is a pitch axis, and wherein the second axis includes one or more of a roll axis and a yaw axis.

5. The method of claim 1, wherein the view of the first card includes a full-screen view, and wherein the alternate view of the first card includes a zoomed-out view of the full-screen view.

6. A method comprising:
   determining, by a wearable computing device, that the wearable computing device is being worn on a head; and
   while the wearable computing device is being worn:
   providing for display a view of a first card of a plurality of cards, wherein the plurality of cards include respective virtual displays of content;
   detecting head-movement data indicative of a head rotation about an axis;
   responsive to the head rotation exceeding a given rotation threshold, displaying, for a predetermined time window, a visual prompt to provide a request to navigate to a subsequent card in the navigable menu;
   detecting an eye gesture indicative of the request to navigate to the subsequent card; and
   responsive to the eye gesture being determined within the predetermined time window, displaying a graphical representation of navigation to the subsequent card in a direction corresponding to the head rotation.

7. The method of claim 6, wherein the axis includes one or more of a roll axis and a yaw axis.

8. The method of claim 6, wherein the visual prompt is based on the direction of the head rotation, and wherein the visual prompt includes one or more of a display arrow, at least a portion of a circle, and a thin vertical bar.

9. A system, comprising:
   a head-mountable device (HMD);
   at least one processor coupled to the HMD; and
   data storage comprising instructions executable by the at least one processor to cause the system to perform functions comprising:
   determining that the HMD is being worn on a head; and
   while the HMD is being worn:
   providing for display a view of a first card of a plurality of cards, wherein the plurality of cards include respective virtual displays of content;
   detecting first head-movement data indicative of a first head rotation about a first axis;
   detecting one or more eye gestures temporally associated with the first head rotation;
   responsive to detecting the one or more temporally-associated eye gestures, displaying a navigable menu, wherein the navigable menu includes an alternate view of the first card and at least a portion of one or more of the plurality of cards;
   detecting second head-movement data indicative of a second head rotation about a second axis; and
   responsive to detecting the second head-movement data, displaying a graphical representation of navigation through the navigable menu in a direction corresponding to the second head rotation.

10. The system of claim 9, the functions further comprising:
    determining a reference point indicative of an angular position of the head about the second axis, wherein displaying the graphical representation of the navigation through the navigable menu is based on the second rotation exceeding a predetermined angular displacement threshold from the reference point.

11. The system of claim 9, wherein the one or more eye gestures include two successive eye blinks.

12. The system of claim 9, the functions further comprising:
- determining a reference point indicative of an angular position of the HMD about a third axis;
- detecting third head-movement data indicative of a third head rotation about a third axis;
- responsive to the third head rotation exceeding a predetermined angular displacement threshold from the reference point, displaying, for a predetermined time window, a visual prompt to provide a request to navigate to a subsequent card in the navigable menu;
- detecting another eye gesture indicative of the request to navigate to the subsequent card; and
- responsive to the other eye gesture being determined within the predetermined time window, displaying a graphical representation of navigation to the subsequent card in a direction corresponding to the third head rotation.

13. The system of claim 12, wherein the predetermined angular displacement threshold is about fifteen degrees, and wherein the predetermined time window is about three seconds.

14. The method of claim 1, further comprising:
- determining a reference point indicative of an angular position of the wearable computing device about the second axis,
- wherein displaying the graphical representation of the navigation through the navigable menu is based on the second rotation exceeding a predetermined angular displacement threshold from the reference point.

15. The method of claim 1, wherein displaying the graphical representation of the navigation through the navigable menu comprises displaying a graphical representation of navigation through the navigable menu at a first speed, the method further comprising:
- substantially simultaneous to detecting the one or more temporally-associated eye gestures, determining a reference point indicative of an angular position of the head about the second axis;
- detecting third head-movement data indicative of another head rotation about the second axis exceeding a predetermined angular displacement threshold from the reference point, wherein the other head rotation is indicative of a request to navigate through the navigable menu at a second speed that is different from the first speed; and
- responsive to detecting the third head-movement data, displaying a graphical representation of navigation through the navigable menu at the second speed in a direction corresponding to the other head rotation.

16. The method of claim 15, wherein the graphical representation of the navigation through the navigable menu at the first speed includes about a 50% zoomed-out view of the plurality of cards, and wherein the graphical representation of the navigation through the navigable menu at the second speed includes about a 33% zoomed-out view of the plurality of cards.

17. The method of claim 1, further comprising:
- detecting third head-movement data indicative of another head rotation about the first axis, wherein the other head rotation is indicative of a request to stop ongoing navigation through the navigable menu and to display a particular card of the plurality of cards associated with the navigation through the navigable menu; and
- responsive to detecting the third head-movement data and based on a direction of the other head rotation, displaying a full-screen view of the particular card.

18. The system of claim 9, wherein the graphical representation of the navigation through the navigable menu includes a graphical representation of a pan through the navigable menu.

19. The system of claim 9, wherein the one or more eye gestures include one or more eye winks.

\* \* \* \* \*